United States Patent
Egerer et al.

(10) Patent No.: US 9,162,322 B2
(45) Date of Patent: Oct. 20, 2015

(54) METHOD OF PRODUCING METALLIC COMPOSITE PIPES

(71) Applicant: NEXANS, Paris (FR)

(72) Inventors: Ralf Egerer, Seesen (DE); Holger Schulz, Hannover (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/514,539

(22) Filed: Oct. 15, 2014

(65) Prior Publication Data

US 2015/0102088 A1    Apr. 16, 2015

(30) Foreign Application Priority Data

Oct. 16, 2013   (EP) .................................... 13306420

(51) Int. Cl.
- B23K 31/02 (2006.01)
- B23K 37/00 (2006.01)
- B21C 37/08 (2006.01)
- B21C 37/09 (2006.01)

(52) U.S. Cl.
CPC ........... B23K 31/027 (2013.01); B21C 37/0826 (2013.01); B21C 37/09 (2013.01); B23K 37/00 (2013.01)

(58) Field of Classification Search
CPC .... B21C 37/08; B21C 37/09; B21C 37/0807; B21C 37/0822; B21C 37/083; B23K 2201/06; B23K 11/062; B23K 11/166; B23K 13/025; B23K 1/16; C23C 2/38; C23C 26/02; C23C 2/26
USPC .................. 228/147, 150, 231, 17.5, 214, 219
See application file for complete search history.

(56) References Cited

U.S. PATENT DOCUMENTS

| | | | | |
|---|---|---|---|---|
| 5,732,874 A | * | 3/1998 | Borzym et al. | ............... 228/147 |
| 5,915,421 A | | 6/1999 | Borzym et al. | |
| 6,018,859 A | | 2/2000 | Borzym et al. | |
| 2003/0192160 A1 | * | 10/2003 | Luo et al. | ..................... 29/421.1 |
| 2012/0267345 A1 | * | 10/2012 | Clark et al. | .............. 219/121.35 |

FOREIGN PATENT DOCUMENTS

| | | | |
|---|---|---|---|
| CN | 200972353 Y | * | 11/2007 |
| CN | 101315239 A | * | 12/2008 |
| DE | 2432962 | | 1/1976 |

OTHER PUBLICATIONS

CN 101315239 A computer english translation.*
CN 200972353 Y computer english translation.*
Search Report dated 2014.

* cited by examiner

Primary Examiner — Erin Saad
(74) Attorney, Agent, or Firm — Sofer & Haroun, LLP

(57) ABSTRACT

A method is provided for producing a pipe from a band which has a layer of a first metal and a layer of a second metal, the layers being metallurgically bonded to one another over the entire length of the band. Along the two longitudinal edges of the band, the first metal is removed from the second metal in strips which run over the entire length of the band. The band is formed into the open-seam pipe with the first metal located on the outside, and the abutting edges of the layer of the second metal are welded to one another forming a pipe which is closed all the way round. In the region of the weld seam, a layer of the first metal is then deposited on the second metal to produce a pipe with a layer of the first metal which is closed all the way round.

8 Claims, 2 Drawing Sheets

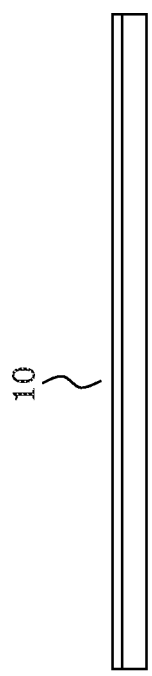
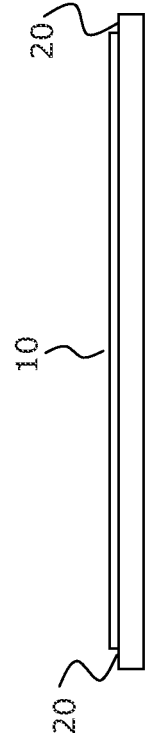
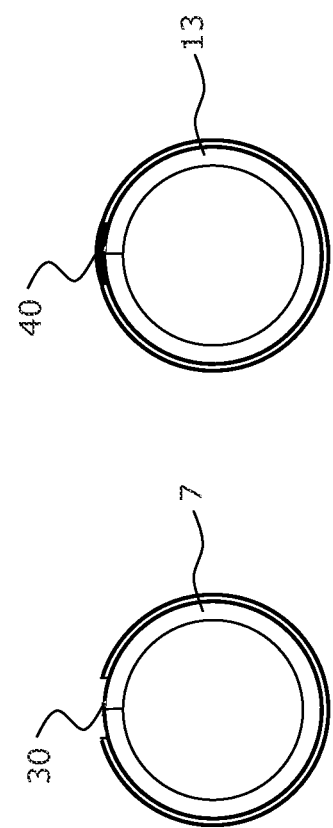

US 9,162,322 B2

METHOD OF PRODUCING METALLIC COMPOSITE PIPES

RELATED APPLICATION

This application claims the benefit of priority from European Patent Application No. 13 306 420.4, filed on Oct. 16, 2013, the entirety of which is incorporated by reference.

BACKGROUND

1. Field of the Invention

The invention relates to a method which is intended for producing a pipe from a band which consists of a layer of a first metal and of a layer of a second metal, the layers being metallurgically bonded to one another over the entire length of the band, and by means of which the band, running in longitudinally, is formed into an open-seam pipe such that its longitudinal edges butt against one another along a longitudinally extending slit, and by means of which the slit is welded in order to form a pipe which is closed all the way round.

The term 'metal' will be understood hereinbelow likewise to mean the term "alloy".

2. Description of Related Art

Metallic pipes made of two layers of different metals have various applications, in particular in the cable industry and for transporting gases and liquids. In the case of such composite pipes, the desired properties of the metals used can advantageously be utilized equally. For example it is possible for a pipe to be plated on the outside for corrosion-prevention reasons or to provide better heat conduction. Electrically conductive cables may consist of the inexpensive basic material aluminum with a layer of copper, which is a good electric conductor, plated thereon. Such CCA (copper-clad aluminum) pipes are particularly effective, by virtue of the skin effect, as high-frequency conductors.

Known methods of producing such metallic pipes are based on electroplating or mechanical bonding techniques.

A metallic layer can be electroplated on a metal pipe, as is done, for example, in the production of galvanized steel pipes. This gives rise to an unbreakable bond between the two metal layers. Electroplating is an energy-intensive process and is associated with relatively low production speeds.

The mechanical methods include, for example, plating. A flat metallic band has a thin flat band made of some other metal rolled onto it. A metal strip plated in this way can then be formed into a pipe and welded. One disadvantage of this method is that there is no self-contained, uniform outer layer present in the weld-seam region of the pipe, since the two metals mix during welding. As a result, it is not possible for the material properties of the pipe to be set in a controlled manner in the weld-seam region and these material properties can differ considerably from those of the rest of the pipe. Moreover, mixing may result in embrittlement of the weld seam.

EP 1 469 486 B1 describes a copper-coated aluminum strip which can be used for example for producing coaxial cables. The copper-plated band is produced, for a desired application, such that the aluminum strip is somewhat wider than the copper strip. During the operation of welding the band which is formed into a pipe, it is only the aluminum which is welded. However, this results in the copper layer having a gap along the aluminum weld seam. The conductive properties of the finished cable are therefore impaired particularly in the high-frequency range. Furthermore, the aluminum is exposed to corrosion in the weld-seam region.

OBJECTS AND SUMMARY

It is an object of the invention to provide a continuous method of producing high-quality pipes which have a uniform outer layer which is closed all the way round and do not have any alterations in the material properties in the weld-seam region in relation to the rest of the pipe.

This object is achieved according to the invention in
that, along the two longitudinal edges of the band, the first metal is removed from the second metal in strips which run over the entire length of the band,
that the band is formed into the open-seam pipe with the first metal located on the outside,
that the abutting edges of the layer of the second metal are welded to one another, and
that, in the region of the weld seam, a layer of the first metal is deposited on the second metal to produce a pipe with a layer of the first metal which is closed all the way round.

The method according to the invention ensures that the first and second metals do not mix in the weld-seam region and therefore, in particular, do not give rise to undesired embrittlement. The material properties of the pipe in the weld-seam region therefore differ only very slightly from those of the rest of the pipe.

Alongside the advantages which are achieved directly from the object of the invention, the invention also provides the advantages that the method according to the invention is flexible, allows high production speeds, is associated with relatively low production costs and requires a comparatively small amount of energy. In particular the step of removing the strips of the first metal has the advantage that plated metal bands with a larger starting width than is necessary for the pipe which is to be produced can be used in the method according to the invention. These wide metal bands (usually present in coiled form) have metal bands of the necessary width required for the desired application cut from them. The cut-to-size bands can then be trimmed along their edges, for example by means of rotary shears, and it is therefore possible to use one cut-to-size band to produce pipes of slightly different pipe diameters. The method according to the invention for producing plated metal pipes is thus flexible and cost-effective.

The method according to the invention will be explained with reference to the drawings.

BRIEF DESCRIPTION OF THE DRAWINGS

Exemplary embodiments of the subject matter of the invention are illustrated in she drawings, in which:

FIGS. 2A-2D each show a schematic illustration of a cross section of the metal band or of the pipe during method steps according to the invention.

DETAILED DESCRIPTION

Figure 1:
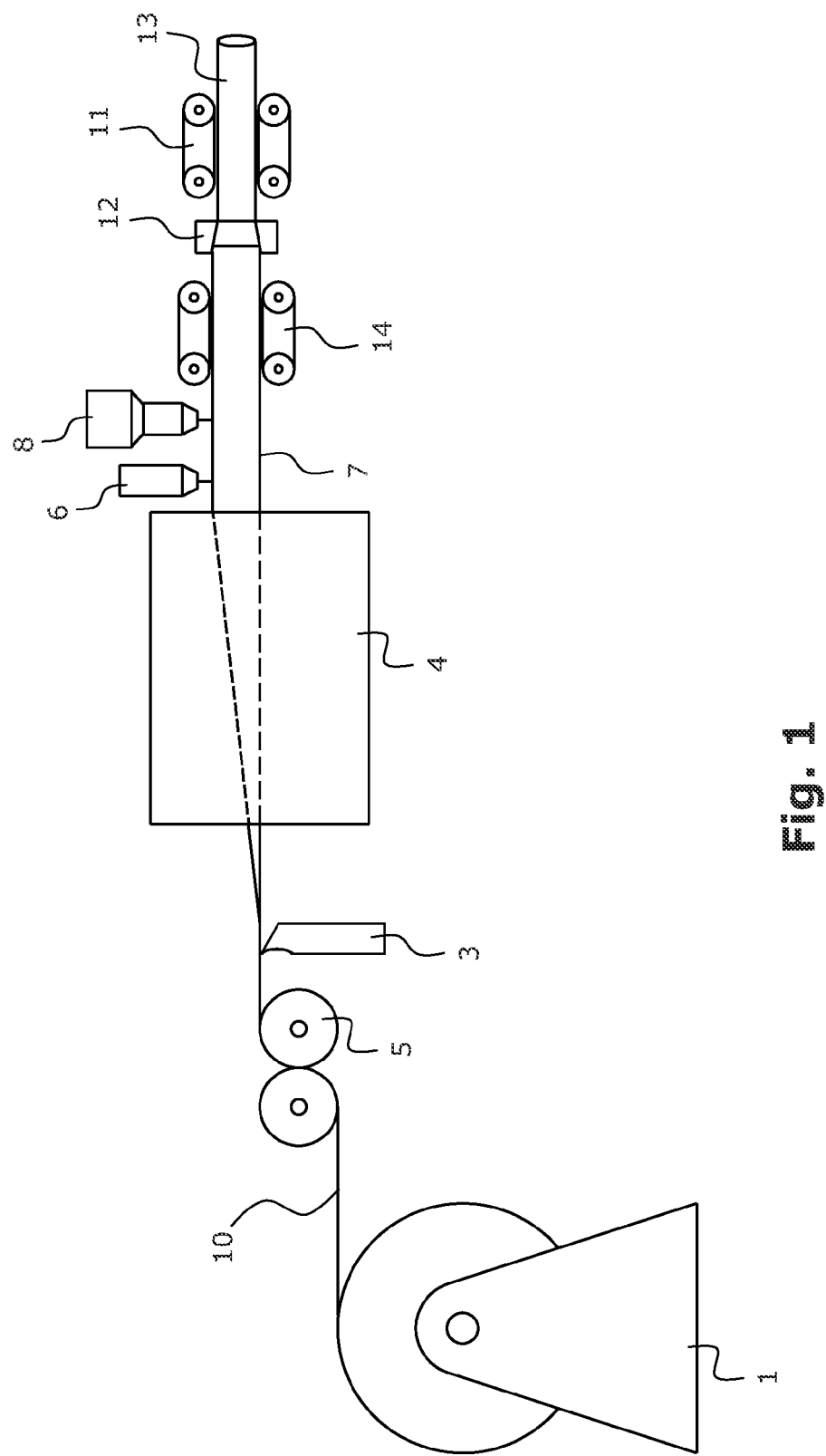
FIG. 1 shows a schematic illustration of an apparatus for producing a pipe from metal in accordance with an exemplary embodiment of the method according to the invention.

The apparatus illustrated schematically in FIG. 1 is used to produce a pipe from metal using the method according to the invention. A metal band 10 is withdrawn from a band store 1. The band 10, illustrated in FIG. 2A consists of a layer of a first metal and of a layer of a second metal, the layers being metallurgically bonded to one another over the entire length of the band. In a skiving or milling arrangement 3, along the two longitudinal edges of the band 10, the first metal is removed from the second metal in strips which run over the entire length of the band. FIG. 2B shows, schematically, the metal band 10 with the locations 20 at which the strips of the first metal have been removed. Any partial removal of the second metal accompanying this operating step does not have any significant influence on the quality of the finished pipe.

The band 10 is then fed to a forming apparatus 4, e.g. a roller or sliding tool. Band edge or rotary shears 5 are located between the band store 1 and the forming apparatus 4 and are used to cut the band 10 to size. The shears 5 may he arranged upstream or downstream of the skiving blade 3.

To produce the pipe, the band 10 is then formed into an open-seam pipe in the forming apparatus 4, to be precise such that the layer of the first metal is located on the outside. At the same time, it is possible to feed a cable core or some other type of filling (not illustrated), around which the open-seam pipe is guided. The abutting edges of the layer of the second metal, which run in the longitudinal direction of the open-seam pipe, are welded to one another in a welding arrangement 6, a pipe 7 which is closed all the way round being obtained as a result. A cross section of the welded pipe 7 with a gap 30 of the first metal in the region of the weld seam is depicted in FIG. 2C. The longitudinal seam welding is preferably done by tungsten inert gas or laser welding.

In the region of the weld seam, a layer of the first metal is then deposited on the second metal in a second welding arrangement 8, a pipe with a layer of the first metal which is closed all the way round being obtained as a result. A cross section of the pipe 13 produced, in which the deposited layer 40 of the first metal completely closes the gap left behind following the welding of the open-seam pipe, is shown in FIG. 2D. During the deposition welding, the first metal is fed continuously, in powder, wire or hand form, to the weld location and the material is welded by means of a laser beam. The surface of the second metal starts to melt in the region of the weld seam. Surface deposition takes place preferably under a protective atmosphere.

As an alternative, it is also possible for the first. metal to be deposited on the weld seam of the second metal by thermal spraying. During thermal spraying, particles of the melted first metal are sprayed in a gas stream onto the surface of the second metal. As they come into contact with the surface, the sprayed particles wedge tight or interlock with the same, and this therefore forms a layer of the first metal. The surface of the second metal does not start to melt here and is therefore subjected to thermal loading only to a slight extent. Laser spraying is an example of thermal spraying.

In the case of both methods mentioned, the heated zone in the region of the weld seam of the second metal is very small. It is therefore advantageously possible to use both methods to deposit a first metal with a high melting temperature, for example copper, on a second metal with a lower melting temperature, for example aluminum, without the second metal melting away or the weld seam of the second metal being impaired. This likewise applies correspondingly to aluminum and copper alloys.

As illustrated in FIG. 1, the pipe 13 produced may be gripped by a withdrawal apparatus 11 and drawn through a diameter-reducing arrangement 12 provided upstream of the withdrawal apparatus 11. If the pipe contains a core, the diameter of the pipe is reduced, as the pipe is drawn downward, such that the pipe ends up butting against the core, and this therefore removes an air gap which is present at the start between the pipe and core. The diameter-reducing arrangement 12 may be, for example, a die. It is likewise possible for the diameter-reducing arrangement 12 to comprise at least. one roller frame (e.g. a so-called Turk's head). The roller frame may or may not be driven. This drawing or rolling process is accompanied by the surface of the outer, first metal being smoothed or evened out in the deposition region. There is no decrease in the wall thickness of the pipe during this reduction step.

The withdrawal apparatus 11 may comprise, for example, a band-withdrawal means or a collet-chuck withdrawal means. As illustrated in FIG. 1, a further withdrawal apparatus 14 may be arranged upstream of the die or roller frame 12. The further withdrawal apparatus 14 applies the force which is necessary in order to unwind the metal band 10 from the pay-off means 1 and draw it through the possibly present band edge shears 5 and the forming apparatus 4, if these do not have a dedicated drive. All that is then required is for the withdrawal apparatus 11 to apply the force which is necessary for deforming the pipe 13 in the die or roller frame 12. Furthermore, as the pipe is being drawn downward, it is possible for the pipe to exhibit torsion and relatively small levels of vibration. These movements may have an adverse effect on the weld result. The further withdrawal apparatus 14 serves for isolating the influences of the reduction operation on the welding in the upstream weld arrangements 6, 8.

The finished metal pipe 13 may then be fed to further processing or mounting arrangements (not illustrated), for example a take-up means or a cutting unit.

An example of a pipe which is produced using the method described is the aforementioned CCA pipe, which comprises a pipe which is made of aluminum or of an aluminum alloy and has an outer layer made of copper or of a copper alloy. Such CCA pipes may serve, for example, as an inner conductor and shield in high-frequency cables or as a shield in high-voltage cables.

A further example is constituted by steel or stainless-steel pipes, which have a copper or a zinc layer on the outside serving for corrosion prevention. It is likewise possible for steel pipes to have a decorative brass layer on the outside.

The method according to the invention is suitable for producing metal pipes of circular cross section and for producing pipes of other cross sections, for example rectangular pipes. Composite pipes of all types and cable sheaths can be produced using the method according to the invention. Instead of the metals mentioned, it is also possible to use non-ferrous metals and alloys of the metals mentioned or of other metals.

The invention claimed is:

1. Method for producing a pipe from a band which has a layer of copper and of a layer of aluminum, the layers being metallurgically bonded to one another over the entire length of the band, where the band, running in longitudinally, is formed into an open-seam pipe such that its longitudinal edges butt against one another along a longitudinally extending slit, and where the slit is welded in order to form a pipe which is closed all the way round, said method comprising the steps of:

along the two longitudinal edges of the band, the copper is removed from the aluminum in strips which run over the entire length of the band;

the band is formed into the open-seam pipe with copper located on the outside;

the abutting edges of the aluminum layer are welded to one another; and in the region of the weld seam, a copper layer is deposited on the outside of the pipe on the exposed aluminum to produce a pipe with a copper layer which is closed all the way round.

2. Method according to claim 1, wherein the copper layer is deposited in the region of the weld seam by means of laser-deposition welding.

3. Method according to claim 1, wherein the copper layer is deposited in the region of the weld seam under a protective atmosphere.

4. Method according to claim 1, wherein the pipe is reduced in diameter in at least one reducing stage.

5. Method according to claim 1, wherein a core is introduced into the as yet unwelded open-seam pipe.

6. Method according to claim 5, wherein the pipe is reduced in diameter, in at least one reducing stage, until it butts against the core.

7. Method according to claim 1, wherein the edges of the metal band are trimmed prior to the pipe being formed.

8. Method according to claim 1, wherein the pipe has any one of round, polygonal or other type of cross section.

* * * * *